(12) United States Patent
Wu et al.

(10) Patent No.: US 7,478,033 B2
(45) Date of Patent: Jan. 13, 2009

(54) SYSTEMS AND METHODS FOR TRANSLATING CHINESE PINYIN TO CHINESE CHARACTERS

(75) Inventors: Jun Wu, Los Altos, CA (US); Hulcan Zhu, San Jose, CA (US); Hongjun Zhu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 864 days.

(21) Appl. No.: 10/802,479

(22) Filed: Mar. 16, 2004

(65) Prior Publication Data

US 2005/0209844 A1    Sep. 22, 2005

(51) Int. Cl.
G06F 17/28    (2006.01)
(52) U.S. Cl. .................. 704/2; 704/1; 704/9; 704/10
(58) Field of Classification Search .............. 704/2, 704/1, 9, 10
See application file for complete search history.

(56) References Cited

U.S. PATENT DOCUMENTS

| | | | |
|---|---|---|---|
| 5,270,927 A * | 12/1993 | Sproat | 715/264 |
| 5,805,832 A | 9/1998 | Brown et al. | |
| 5,835,924 A | 11/1998 | Maruyama et al. | |
| 6,073,146 A | 6/2000 | Chen | |
| 7,165,019 B1 * | 1/2007 | Lee et al. | 704/2 |
| 2004/0215465 A1 * | 10/2004 | Lee | 704/277 |
| 2007/0118356 A1 * | 5/2007 | Badino | 704/10 |

FOREIGN PATENT DOCUMENTS

WO    WO 01/35250    5/2001

OTHER PUBLICATIONS

Nie et al.("unknown word detection and segmentation of Chinese using statistical and heuristic knowledge", communications of COLIPS, vol. 5. No. 1&2, Dec. 1995, p. 47-57).*
Li et al., "Transductive HMM Based Chinese Text Chunking", Proceedings of Natural Language Processing and Knowledge Engineering, Oct. 26, 2003, pp. 257-262, IEEE, Piscataway NJ, USA.
Sakai et al., "Generating Tranliteration Rules for Cross-Language Information Retrieval from Machine Translation Dictionaries", Proceedings of IEEE International Conference on Systems, Man and Cybernetics, Oct. 6, 2002, pp. 289-294, IEEE, New York NY, USA.

* cited by examiner

*Primary Examiner*—Qi Han
(74) *Attorney, Agent, or Firm*—Fish & Richardson P.C.

(57) ABSTRACT

Systems and methods to process and translate pinyin to Chinese characters and words are disclosed. A Chinese language model is trained by extracting unknown character strings from Chinese inputs, e.g., documents and/or user inputs/queries, determining valid words from the unknown character strings, and generating a transition matrix based on the Chinese inputs for predicting a word string given the context. A method for translating a pinyin input generally includes generating a set of Chinese character strings from the pinyin input using a Chinese dictionary including words derived from the Chinese inputs and a language model trained based on the Chinese inputs, each character string having a weight indicating the likelihood that the character string corresponds to the pinyin input. An ambiguous user input may be classified as non-pinyin or pinyin by identifying an ambiguous pinyin/non-pinyin ASCII word in the user input and analyzing the context to classify the user input.

13 Claims, 5 Drawing Sheets

SYSTEMS AND METHODS FOR TRANSLATING CHINESE PINYIN TO CHINESE CHARACTERS

BACKGROUND OF THE INVENTION

1. Field of the Invention

The present invention relates generally to translating Chinese pinyin to Chinese characters. More specifically, systems and methods using a computer to process and translate phonetic Chinese text or pinyin to Chinese characters and words are disclosed.

2. Description of Related Art

Inputting and processing Chinese language text on a computer can be very difficult. This is due in part to the sheer number of Chinese characters as well as the inherent problems in the Chinese language with text standardization, multiple homonyms, and invisible (or hidden) word boundaries that create ambiguities which make Chinese text processing difficult.

One common method available today for inputting Chinese language text into a computer system is one using phonetic input, e.g. pinyin. Pinyin uses Roman characters and has a vocabulary listed in the form of multiple syllable words. However, the pinyin input method results a homonym problem in Chinese language processing. In particular, as there are only approximately 1,300 different phonetic syllables (as can be represented by pinyins) with tones and approximately 410 phonetic syllables without tones representing the tens of thousands of Chinese characters (Hanzi), one phonetic syllable (with or without tone) may correspond to many different Hanzi. For example, the pronunciation of "yi" in Mandarin can correspond to over 100 Hanzi. This creates ambiguities when translating the phonetic syllables into Hanzi.

Many phonetic input systems use a multiple-choice method to address this homonym problem. Once the user enters a phonetic syllable, a list of possible Hanzi characters with the same pronunciation are displayed. However, the process of inputting and selecting the corresponding Hanzi for each syllable can be slow, tedious, and time consuming. Other phonetic input systems are based on determining the likelihoods of each possible Hanzi character based on the adjacent Hanzi characters. The probability approach can further be combined with grammatical constraints. However, the accuracy of the conversion from phonetic to Hanzi of such methods is often limited when applied to literature (e.g., with many descriptive sentences and idioms) and/or spoken or informal language as is used on the web in user queries and/or bulletin board system (BBS) posts, for example. In addition, low dictionary coverage often contributes to the poor conversion quality in spoken language.

In addition to the homonym problem, a word boundary problem exists when processing Chinese language text. In particular, although more than 80% of words in modern Chinese have multiple syllables and thus contain two or more Hanzi, there is no word separation in the Chinese writing system. Input of phonetic Chinese is usually performed syllable by syllable without accounting for word boundaries. In particular, there is no consistency among users in inputting phonetic Chinese (pinyin) word boundaries. For example, some people consider "Beijing daxue" (phonetic representation meaning Beijing University) as two words while others may regard the pinyin as one word and input the pinyin without any boundaries, i.e., "Beijingdaxue."

The homonym problem and the lack of word boundaries are two of the main contributing factors that make it difficult to provide an easy, effective and accurate mechanism for Chinese language text input and processing. A given Chinese text input in pinyin may create many ambiguities that the conventional methods cannot properly resolve.

Thus what is needed is a computer system for effective, efficient and accurate processing and translating phonetic Chinese text, e.g., pinyin, to Chinese characters and/or words.

SUMMARY OF THE INVENTION

Systems and methods using a computer to process and translate phonetic Chinese text or pinyin to Chinese characters and words are disclosed. The term computer generally refers to any device with computing power such as personal digital assistants (PDAs), cellular telephones, network switches. The systems and methods are particularly applicable to web-based search engines but are applicable to various other applications. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

A method to train a Chinese language model generally includes extracting unknown character strings from a set of Chinese inputs, e.g., Chinese documents and/or user Chinese inputs and/or queries, determining valid words from the unknown character strings by comparing frequencies of occurrence of the unknown character strings with frequencies of occurrence of individual characters of the unknown character string, and generating a transition matrix of conditional probabilities, e.g., based on the n-gram counts ($n \geq 1$) that include the counts of n-tuples of adjacent and non-adjacent words as generated from the Chinese inputs, for predicting a word string given a context. The n-gram counts may include the number of occurrences of each n-word sequence. The extracting of the unknown character strings may utilize a preexisting Chinese dictionary. An unknown character string may be determined to be a valid new character string if the frequency of occurrence of the unknown character string as compared with frequencies of occurrence of the individual characters of the unknown character string is greater than a predetermined threshold.

According to another embodiment, a system for training a Chinese language model generally includes a segmenter configured to segment unknown character strings from a set of Chinese inputs, a new word analyzer configured to determine valid words from the unknown character strings by comparing frequencies of occurrence of the unknown character strings with frequencies of occurrence of individual characters of the unknown character string, and a Chinese language model training module configured to generate a transition matrix of conditional probabilities for predicting a word string given a context.

According to yet another embodiment, a computer program product for use in conjunction with a computer system, the computer program product having a computer readable storage medium on which are stored instructions executable on a computer processor, the instructions generally includes extracting unknown character strings from a set of Chinese inputs, determining valid words from the unknown character strings by comparing frequencies of occurrence of the unknown character strings with frequencies of occurrence of individual characters of the unknown character string, and generating a transition matrix of conditional probabilities for predicting a word string given a context.

A method for translating a pinyin input to at least one Chinese character string generally includes generating a set of character strings from the pinyin input, each character string having a weight associated therewith indicating the likelihood that the character string corresponds to the pinyin input, the generating includes utilizing a Chinese dictionary including words extracted from a set of Chinese inputs and a language model trained based on the set of Chinese inputs. The generating may include performing a Viterbi algorithm utilizing the Chinese dictionary including words extracted from the set of Chinese inputs and the language model based on the set of Chinese inputs. The method may also include generating multiple pinyin candidates from the pinyin input such that each pinyin candidate corresponds to a set of character strings. The method may further include sorting and ranking the set of character strings according to the likelihood that the pinyin input corresponds to the character string. The method may be utilized in performing a search, e.g., a web search by a search engine and a query to a database containing organized data for a character string as selected by a user from the set of character strings.

According to another embodiment, a system for translating a pinyin input to at least one Chinese character string, generally includes a pinyin-word decoder configured to generate a set of character strings from the pinyin input, each character string having a weight associated therewith indicating the likelihood that the word string corresponds to the pinyin input, the pinyin-word decoder being further configured to utilize a Chinese dictionary that includes words extracted from a set of Chinese inputs and a language model trained based on the set of Chinese inputs.

According to yet another embodiment, a computer program product for use in conjunction with a computer system, the computer program product having a computer readable storage medium on which are stored instructions executable on a computer processor, the instructions includes generating a set of character strings from the pinyin input, each character string having a weight associated therewith indicating the likelihood that the character string corresponds to the pinyin input, the generating includes utilizing a Chinese dictionary including words extracted from a set of Chinese inputs and a language model trained based on the set of Chinese inputs.

A method for pinyin classification of a user input may generally include identifying an ambiguous word in the user input, the ambiguous word being selected from a database of words that are valid both in non-pinyin and in pinyin and analyzing context words of the user input to selectively classify the user input as non-pinyin or as pinyin. The method may also include computing the likelihoods of possible Chinese queries that may be generated from ambiguous query and classifying the user input as pinyin input if at least one of the likelihoods computed is above a predetermined threshold, e.g., if the user input is unresolved after the analyzing. The database of valid non-pinyin/pinyin n-grams may be extracted from commonly occurring words in non-pinyin user queries.

According to another embodiment, a pinyin classifier for classifying a user input as non-pinyin or as pinyin generally includes a database of words that are valid both in non-pinyin and in pinyin and a classification engine configured to identify an ambiguous word in the user input selected from the database of words and to analyze context words of the user input to selectively classify the user input as non-pinyin or as pinyin.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods using a computer to process and translate phonetic Chinese text or pinyin to Chinese characters and words are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

The systems and methods generally relate to training a language model, as described below with reference to FIG. 1, by obtaining and processing inputs such as documents and/or user inputs or queries and to serving, as described below with reference to FIG. 2, a pinyin translation utilizing the inputs and the trained language model. By using the set of inputs, user preferences are taken into account and new valid words are determined based on user preferences.

Figure 1:
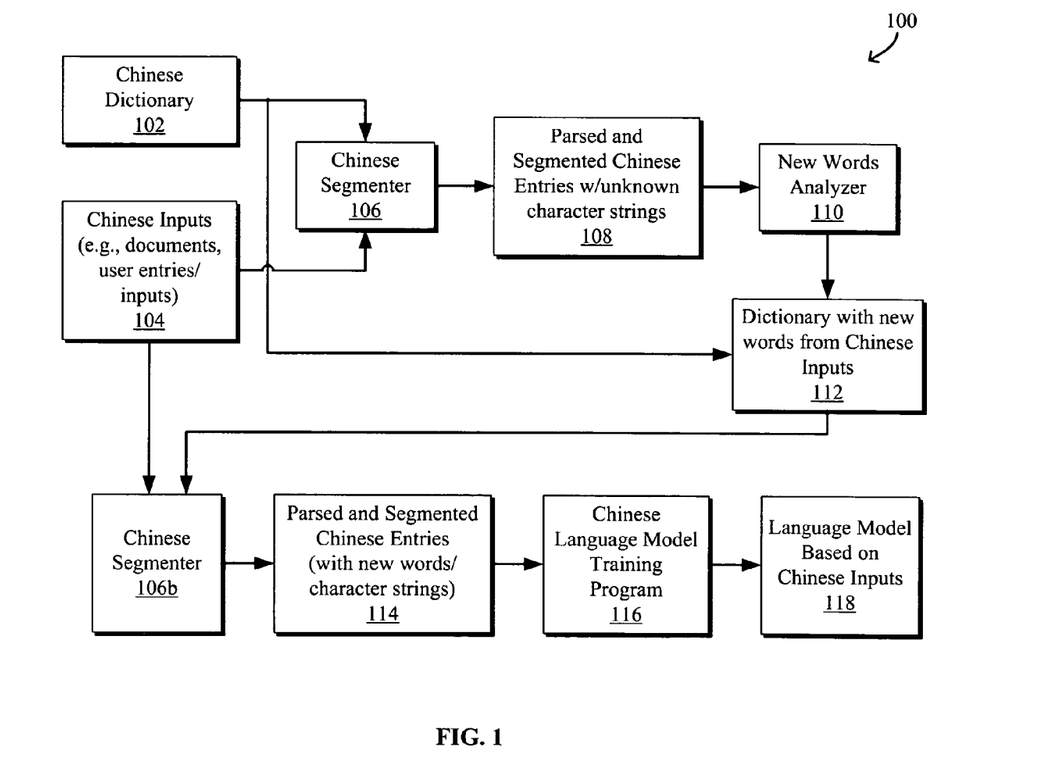
FIG. 1 is block diagram of an illustrative system and method for generating a Chinese dictionary from Chinese input such as Chinese documents and/or user Chinese entries or queries.

FIG. 1 is block diagram of an illustrative system and method 100 for generating a Chinese dictionary and for training Chinese language model based on user Chinese input entries such as user Chinese queries in a web search engine and/or Chinese documents such as those available on the Internet, for example. It is noted that the illustrative systems and methods are described herein and are particularly applicable in the context of Chinese queries, for example, relating to a web search engine and to a search engine for a database containing organized data. However, it is to be understood that the systems and method may be adapted and employed for various other applications in which pinyin is translated to Chinese characters. For example, the system and method may be adapted for a Chinese text input application that generates a Chinese document from a user's pinyin input. It is noted pinyin generally refers to phonetic representation of Chinese characters, with or without representation of the tone associated with the Chinese characters.

A Chinese dictionary 102 and a set of user Chinese inputs such as user Chinese inputs and/or Chinese documents 104 may be used as inputs to a Chinese segmenter 106. User Chinese inputs or entries may be, for example, user Chinese queries or various or other input types. Chinese documents may include Chinese web content and various publications such as newspaper, books, magazines, webpages, and the like. The Chinese dictionary 102 may be one or a combination of various suitable standard or preexisting Chinese dictionaries containing various single- and multi-character Chinese words or terms. In the case of Chinese queries, the set of Chinese inputs 104 may include a collection of user Chinese queries from the past three weeks or two months, for example. The set of Chinese documents 104 may be a set, collection or repository of Chinese documents, for example, documents written in simplified and/or traditional Chinese available on the Internet.

The Chinese segmenter 106 implements algorithms or rules to segment the source Chinese text stream, e.g., a sentence or a phrase, into Chinese word units or words and may optionally also identify grammatical functions. For example, "toufa" is a compound two-character Chinese word meaning "hair" and as such, the Chinese characters representing "toufa" is not decomposed, but rather, is treated as a single word. The segmenter 106 (or other module) may first partition the Chinese document input 104 into sentences prior to the segmentation. Various suitable segmenters may be employed including those that are commercially available such as one by Basis Technology of Cambridge, Mass.

The segmenter 106 generates parsed and segmented Chinese entries with unknown character strings 108 that are analyzed using a new words analyzer 110. The new words analyzer 110 analyzes the unknown or new character strings to determine whether and which of the character strings are valid compound multi-character words. In particular, given a large and diverse lexicon, there may be ambiguous word divisions, unknown proper names, and other words (character strings or compound multi-character words) that are not in the dictionary. For example, abbreviations, truncated terms, newly coined terms, etc. may be formed and become popular and can often be found in documents and/or user inputs but not in a standard Chinese dictionary. The rate of out-of-vocabulary (OOV), i.e., unknown words, in queries and in the spoken language is relatively high. For example, search query logs may contain approximately 4% OOV even when using a large vocabulary of approximately 250,000 most common words. In contrast, newspapers and webpages typically contain only approximately 1% OOV. The new words analyzer 110 may compare the frequencies of the compound multi-character strings with the frequencies of separate occurrences of the individual characters to determine whether and which of the character strings are valid multi-character words. Combining the original Chinese dictionary 102 with the new words identified by the new words analyzer 110 results in a new dictionary 112 with new words generated from the Chinese input such as user Chinese entries or queries. The new dictionary 112 may also include a mapping of each word with its corresponding one or more pinyins. If a given word corresponds to multiple pinyins, the quality of the Chinese character to pinyin mapping may be improved by executing a script to automatically remove and/or by manually removing invalid pinyins. In the case of multiple pinyins, the mapping may also include the corresponding likelihood for each pinyin. The mapping of words in the new dictionary to the corresponding possible pinyins and the likelihood of each of multiple possible pinyin is referred to herein as a generation matrix.

In one illustrative implementation, the new words analyzer 110 may implement different analyses depending on whether the Chinese input is a Chinese document or a user Chinese entry or query. With Chinese documents, the new words analyzer 110 may compute the frequency of each new character string and compute the coverage of subsets of new character strings to extract or determine a relatively small subset of new valid character strings that cover a sufficiently large portion of all new character strings found in the repository of Chinese documents. For a more complete analysis, the new words analyzer may analyze all new character strings. Alternatively, the new words analyzer 110 may remove the new character strings with more than, for example, 7 (or other suitable number of) Chinese characters and group the remaining new character strings, i.e., those with 7 or fewer characters, according to the number of Chinese characters into 7 sets of new character strings (e.g., a separate group for strings having 7 contiguous characters, strings having 6 contiguous characters, strings having 5 contiguous characters, strings having 4 contiguous characters, strings having 3 contiguous characters, strings having 2 contiguous characters, and strings having 1 character). For each set of new character strings, the new words analyzer 110 may compute the coverage of its subsets. Specifically, the terms T in each of the 7 sets may be arranged in decreasing order of frequency $\{T_1 \ldots, T_n\}$. The coverage of a sub-list $L_i$, $\{T_1, \ldots, T_i\}$ is computed as the sum of the frequency of terms in the sub-list $L_i$ divided by the sum of the frequency of all character strings in the set. Each of the 7 sets of new character strings may then be divided into three subsets where the first subset has a coverage of greater than 98% and the first and second subsets have a combined coverage of greater than 99% within the set, for example. The character strings in the second subset may also be further evaluated manually to remove any unlikely character strings. The first subset and the reduced second subset can be combined to form the new set of valid words generated from the repository of Chinese documents. These valid words are added to the dictionary.

To generate valid new words from user entries such as user queries, the new words analyzer 110 may determine n-grams (n≧2) with high frequency and check the frequency of each character string in the n-gram. If the n-gram has a higher frequency than each individual character, the new character string is considered a valid word and the new valid word is added to the dictionary. Because many words used in web searches are not covered in published dictionaries, the addition of such new validated words extracted from user queries will help improve the search quality.

Specifically, after segmenting the user entries, the new words analyzer 110 may treat all strings of multiple individual characters as potential new words. For example, if a user entry "abcdefghij" is segmented as "ab-cd-e-f-g-hij," the string of single characters "e-f-g" is treated as a potential new word. The frequency of the potential new word is computed, e.g., P(efg), and compared to the frequencies of the individual characters, e.g., P(e), P(f), and P(g). If the information gain G is greater than an information gain threshold, the term "efg" is treated as a valid new word. The computation of the information gain G generally depends on the model or assumptions of the underlying application. For example, the information gain G may be determined as P(efg)*log[P(efg)/(P(e)×P(f)×P(g))], i.e., the Kullback-Leibler divergence. The concept is that if a given multi-character string frequently appear together but seldom appear individually or separately, the multi-character string should be treated as a valid new word as the information gain G is very large in such cases. Similar to the valid new words extracted from the Chinese documents, the valid new words extracted from the user entries are also added to the dictionary.

The new dictionary 112 containing the new words extracted from the Chinese documents and/or the user Chinese entries is then utilized by the Chinese segmenter 106b to perform a second segmentation process to generate parsed and segmented Chinese entries 114 using the new dictionary containing the new valid words. The parsed and segmented Chinese entries 114 containing the new valid words are then used to generate or train a Chinese language model 118 using a Chinese language model training program 116.

In particular, the Chinese language model training program 116 generates a transition matrix of conditional probabilities that is the language model for predicting the current word given the context. The language model generally refers to a probability model predicting the current word from the context such as the preceding and subsequent or following words. The transition matrix may be generated based on any suitable statistics of the current word and its context, such as n preceding words and/or part-of-speech tags of preceding words. For example, the transition matrix may be generated based on n-gram (one- or more-word sequence, i.e., n≧1) counts generated from the Chinese inputs, e.g., the user entries and/or Chinese documents. The n-gram counts represent the statistics of the current word, its context (or predictors), and the combination of the word and its context.

Having augmented the Chinese dictionary with new valid words derived from the Chinese inputs and having trained the Chinese language model based on the Chinese inputs, an improved system and method for pinyin to Chinese character translation can be provided. In particular, preprocessing and post-processing are performed in order to serve pinyin translations. Specifically, preprocessing may be performed by filtering the user inputs, preserving non-pinyin tokens and their respective positions within the input and automatically splitting pinyin strings into multiple pinyin candidates. Post-processing may be performed by sorting multiple candidates of results from pinyin decoding, i.e., the Hanzi, and merging the results with the previously preserved non-pinyin tokens.

Figure 2:
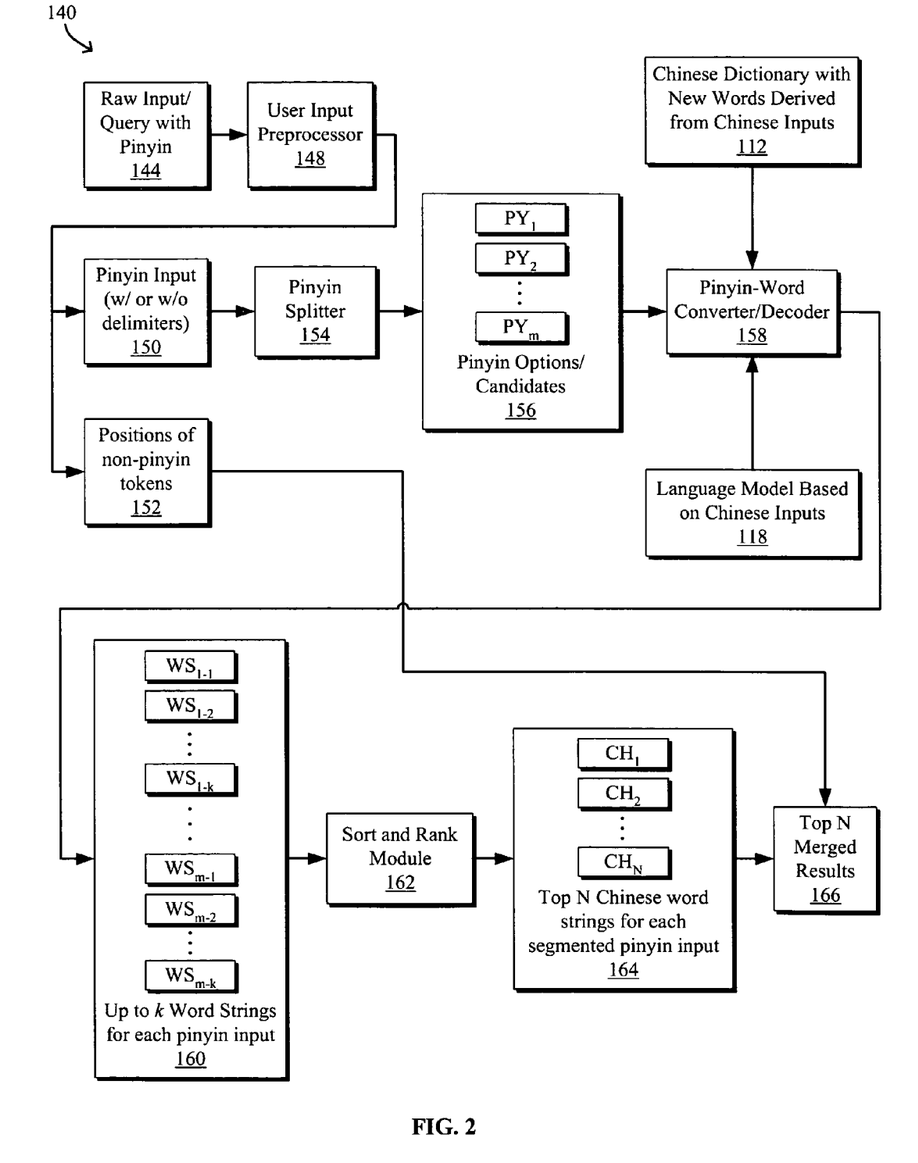
FIG. 2 is block diagram of an illustrative system and method for translating a pinyin input or query to Chinese characters.

FIG. 2 is block diagram of an illustrative system and method 140 for translating a pinyin input or query to Chinese characters. In particular, a raw user input or query 144 is received and filtered by a user input preprocessor 148. As the raw user input or query 144 may contain both alphabetic characters and non-alphabetic characters (numbers, punctuations and non-ASCII characters such as Chinese/Japanese/Korean (CJK) characters), the user input preprocessor 148 filters out the non-pinyin tokens 152 and preserves their respective positions. To determine the non-pinyin tokens, the user input preprocessor 148 may filter out any non-alphabetic characters and optionally any non-pinyin alphabetic input. In particular, the user input preprocessor 148 may classify the alphabetic input as pinyin or non-pinyin as will be described in more detail below with reference to FIGS. 5 and 6.

The pinyin input 150 is processed by a pinyin splitter 154 that splits the pinyin input 150 into multiple pinyin candidates or options $PY_1, PY_2, \ldots, PY_m$ 156. The pinyin input 150 may be with or without delimiters, e.g., spaces, dashes or hyphens, etc. to separate different words, characters or syllables. The pinyin splitter 154 may perform the splitting function using various rules to generate the various pinyin candidates or options $PY_i$. For example, with a pinyin input "xian," the pinyin splitter 154 may generate two candidate pinyin inputs "xi-an" and "xian."

The m candidate pinyins serve as input to a pinyin-word converter or Chinese pinyin decoder 158. The decoder 158 also uses the Chinese dictionary 112 with new valid words as well as the language model 118 trained using the Chinese inputs to generate possible word strings $WS_{i-1}, WS_{i-2}$, etc. for each pinyin candidate $PY_i$. In particular, the word strings generated for each pinyin candidate $PY_i$ may be limited to the k most likely word strings $WS_{i-1}, WS_{i-2}, \ldots WS_{i-k}$, where k may be any suitable number. Each word string $WS_{i-1}, WS_{i-2}$, etc. may be associated with a weight indicating the probability or likelihood that the particular word string WS corresponds to the pinyin input 150. The up to m*k possible word strings WS are then sorted and ranked by the sort and rank module 162 based on their respective weights from which the top N, e.g., N=3, translated Chinese word strings 164 generated from the pinyin input 150 may be selected. The top N translated word strings 164 are merged with the preserved non-pinyin tokens according to their respective positions 152 by a results merger and the top N merged results 166 are presented or served up to the user. In the case of a search engine, the user may then select one of the N merged results 166 as the desired search query.

Figure 3:
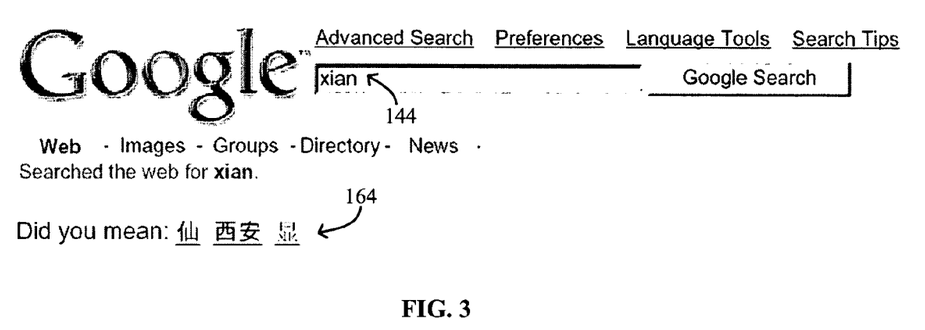
FIG. 3 shows an illustrative page served by a search engine server that presents the top Chinese word strings translated from a user pinyin query "xian," one of which may be selected by the user to perform a web search of the selected Chinese word string.

FIG. 3 shows an illustrative page served by a search engine server that presents the top 3 Chinese word strings 164 translated from a user query "xian" 144. One of the top 3 Chinese word strings may be selected by the user on which to base a web search. The 3 most likely Chinese word strings 164 include two different character translations of "xian" as a single character or syllable and a single translation of "xi an" as two characters or syllables as may be generated by the pinyin splitter 154. In the case of a search engine, as the log of user queries is constantly being updated, the Chinese inputs may be periodically processed, e.g., weekly, to update the Chinese dictionary with new words derived from the Chinese inputs and to update the Chinese language model trained based on the Chinese inputs.

With respect to the user interface shown in FIG. 3, multiple possible translations of the user input or query may be presented to the user similar to how a web search engine may present a spelling correction when the search engine detects that the query may be misspelled. In particular, the multiple possible translations are preceded with the phrase "Did you mean," which alternatively may itself be in Chinese characters or Hanzi. In addition to the list of possible translations, a spelling correction, i.e., in ASCII, of the user input or query may also be provided if it is determined that the user input or query might be misspelled. Each of the multiple possible translations and the spelling correction, if nay, may be a hyperlink to a web search for the particular translation. Such a user interface may be utilized for other language or language format translations in addition to pinyin-Hanzi translations and may even be extended to translations between two non-ASCII language formats, e.g., Chinese-Korean.

Because the pinyin-word decoder utilizes a Chinese language model trained using Chinese inputs and a Chinese dictionary augmented by new words derived from the Chinese inputs, the pinyin-word decoder may provide a better set of translations of the input pinyin to Chinese word strings. For example, if the language model is trained using only webpages and newspapers and without using new words, approximately 67% of pinyin queries are generally correctly converted, i.e., the Chinese character translation of the user's pinyin input reflects the user's intended query. Using input or query data to identify new valid words and to train the language model may improve the accuracy to approximately 85%. The systems and methods for translating a pinyin input or query to Chinese characters may be utilized in various applications. For example, a Chinese character input application may employ such systems and methods for generating Chinese characters for a document from user pinyin inputs. As another example, a search engine such as a web-based search engine may utilize such systems and methods in generating the most likely Chinese word strings corresponding to a user pinyin input from which the user may select one or more Chinese word strings on which to base a search.

The Chinese pinyin decoder 158 will now be described in more detail. Various suitable mechanisms for decoding pinyin inputs to possible Chinese words may be implemented. Various decoders are suitable for translating pinyin to Hanzi (Chinese characters). In one embodiment, a Viterbi decoder using Hidden Markov Models may be implemented. The training for the Hidden Markov Models may be achieved, for example, by collecting empirical counts or by computing an expectation and performing an iterative maximization process. The Viterbi algorithm is a useful and efficient algorithm to decode the source input according to the output observations of a Markov communication channel. The Viterbi algorithm has been successfully implemented in various applications for natural language processing, such as speech recognition, optical character recognition, machine translation, speech tagging, parsing and spell checking. However, it is to be understood that instead of the Markov assumption, various other suitable assumptions may be made in implementing the decoding algorithm. In addition, the Viterbi algorithm is merely one suitable decoding algorithm that may be implemented by the decoder and various other suitable decoding algorithms such as a finite state machine, a Bayesian network, a decision plane algorithm (a high dimension Viterbi algorithm) or a Bahl-Cocke-Jelinek-Raviv (BCJR) algorithm (a two pass forward/backward Viterbi algorithm) may be implemented.

The Hidden Markov Model contains the generation matrix and the transition matrix of conditional probabilities. The generation matrix, as described above, is a mapping of the Chinese terms in the dictionary containing the new terms to the corresponding possible pinyins and the likelihood of each of multiple possible pinyins. The transition matrix of conditional probabilities, also described above, is the language model for predicting the current word given the context and can be built based on n-gram counts generated from the Chinese inputs such as documents and/or user entries.

Figure 4:
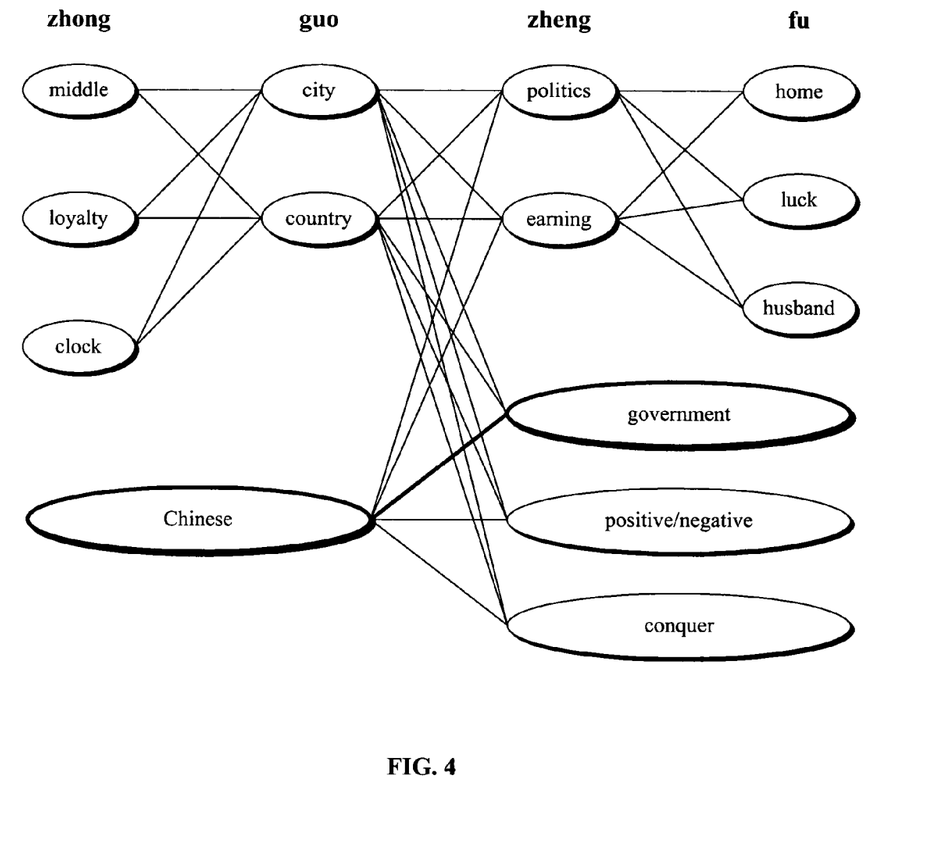
FIG. 4 is a lattice or trellis for illustrating the Viterbi algorithm as applied to an input pinyin "zhong guo zheng fu" meaning Chinese Government.

FIG. 4 is a lattice or trellis for illustrating the Viterbi algorithm as applied to an input pinyin "zhong guo zheng fu" (meaning Chinese Government). Each of the candidate words is shown in FIG. 4 as a node. For example, "zhong" can mean middle, loyalty, or clock, "guo" can mean country or city, "zhong guo" means Chinese, "zheng" can mean politics or earning, "fu" can mean home, luck, or husband, and "zheng fu" can mean government, positive/negative, or conquer.

When the Viterbi algorithm encounters the pinyin "guo," the algorithm not only finds the words that generate this pinyin but also all words that generate this pinyin in combination with its preceding pinyin, i.e., "zhong guo," meaning Chinese. Thus, Chinese, which generates the pinyin zhong-guo can also be a candidate word. The length of all candidate words are taken in to account so that the words that precede each candidate can be properly determined. In particular, each single syllable/character word has a length of 1 while each double syllable character word has a length of 2, etc. For example, the candidate words that can precede the single syllable/character words (words of length 1) home, luck and husband generated at time t=4 can be politics or earning generated at time t=3 but cannot be city or country generated at time t=2. In contrast, the candidate words that can precede the double syllable/character words (words of length 2) government, positive/negative/ and conquer generated at time t=4 can be city, country, or Chinese generated at time t=2.

Each node shown in FIG. 4 has a corresponding generation probability as provided by the generation matrix and each link between two nodes has a corresponding transition probability as provided by the transition matrix of conditional probabilities. After all states are enumerated, the Viterbi algorithm or decoder determines the best path. In the example of FIG. 3, the best path is Chinese-government as shown in bold.

As noted above, after filtering out non-alphabetic characters and prior to processing and translating the alphabetic characters of a user input as a pinyin input, it may be desirable to examine the user input to verify that the input is a pinyin input and not a non-pinyin ASCII input such as an English, French, or German input, i.e., to classify the input as pinyin or non-pinyin ASCII. In particular, a pinyin classifier may be employed to detect whether an ambiguous input or query is in pinyin or non-pinyin. In particular, English and Chinese pinyin share the same character set, i.e., the 26 letters of the alphabet and even some words. For example, each word "Beijing", "women" and "dilute" may be treated as an English word and/or as Chinese pinyin. In one case, the English word and pinyin can have the same semantic meaning in both languages, as is the case with "Beijing." In another case, the same word can be valid in both pinyin and English but have different semantic meanings, as is the case with "woman." In yet another case, the word may have meaning in English (or Chinese) but may be meaningless or invalid in Chinese (or English). For example, "dilute" is a word in English but is meaningless in Chinese despite that the characters corresponding to "di," "lu" and "te" are common in Chinese. The pinyin classifier thus facilitates in detecting the language of ambiguous inputs or queries.

Figure 5:
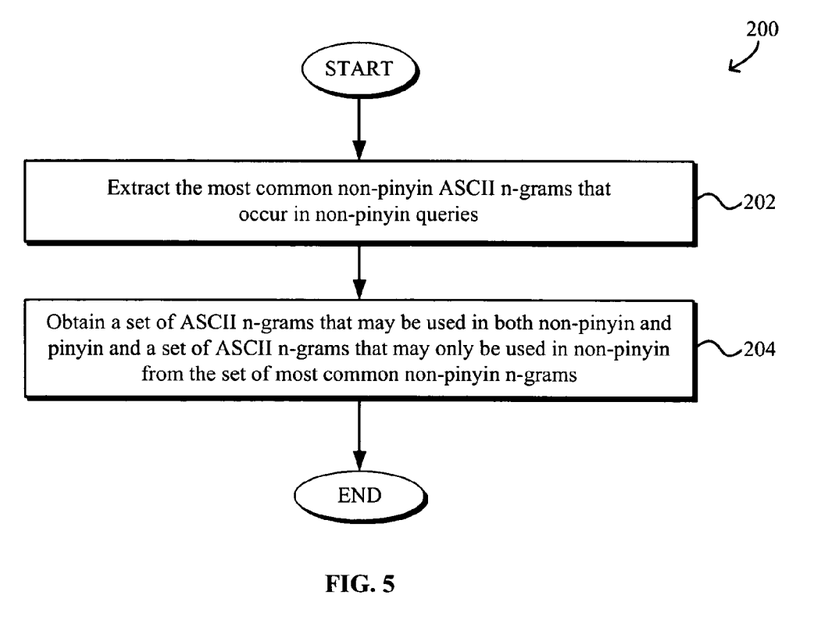
FIG. 5 is a flowchart illustrating an exemplary process for generating a pinyin classifier.
Figure 6:
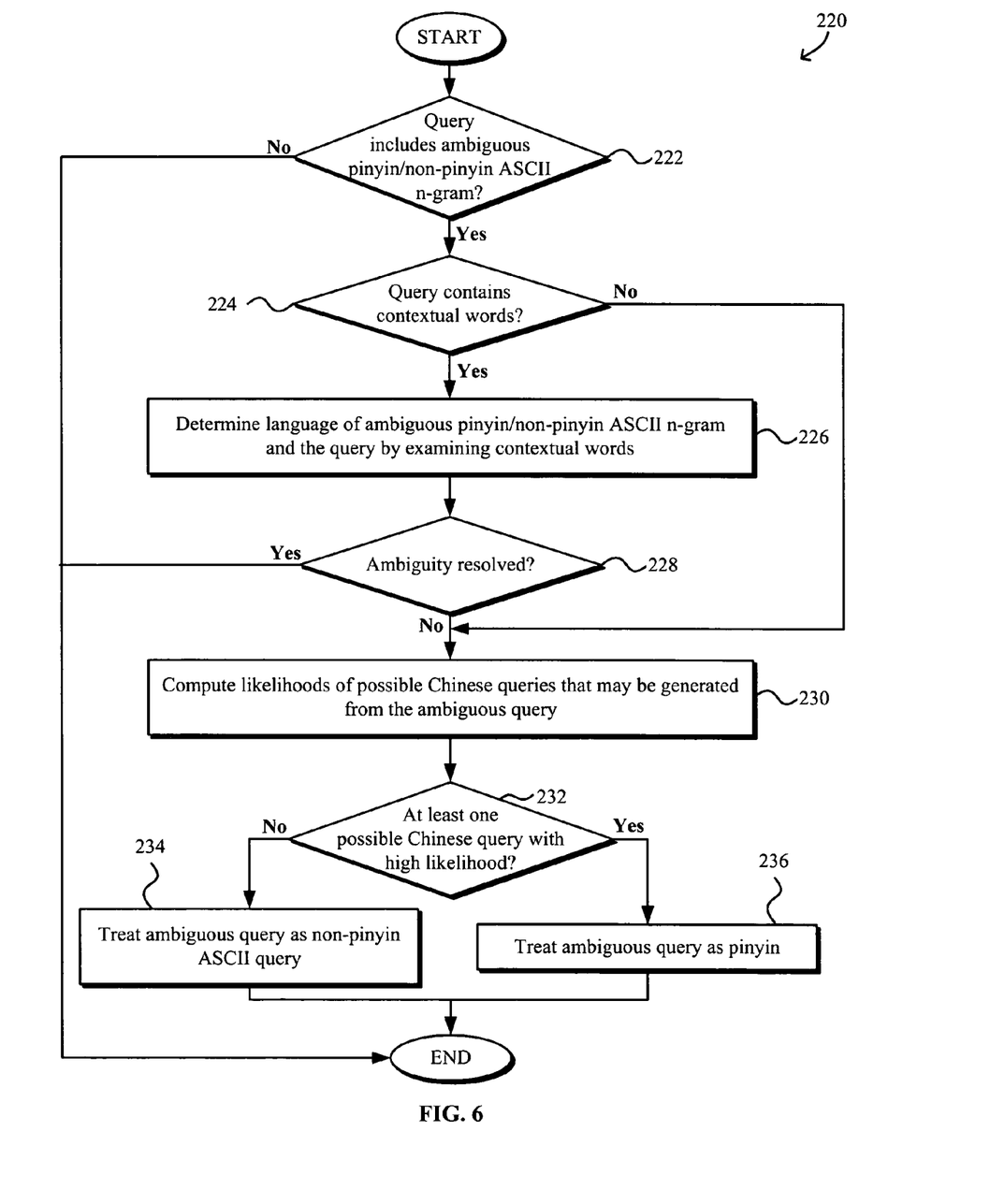
FIG. 6 is a flowchart illustrating an exemplary process for processing a query containing an ambiguous pinyin word.

FIGS. 5 and 6 are flowcharts illustrating an exemplary process 200 for generating a pinyin classifier and an exemplary process 220 for processing a user input or query containing an ambiguous pinyin/non-pinyin ASCII word, respectively. In the exemplary process 200 for generating a pinyin classifier as shown in FIG. 5, the most common ASCII n-grams, e.g., non-pinyin ASCII or English unigrams or words, that occur in non-pinyin ASCII user inputs are extracted at block 202. At block 204, the process 200 determines whether each of the most common ASCII n-grams can also be a pinyin to generate a set of n-grams that may be used in both pinyin and non-pinyin ASCII. Thus if a user input contains one of these ambiguous pinyin/non-pinyin ASCII n-grams, there may be ambiguity as to whether the user input is in pinyin or non-pinyin.

To resolve the ambiguity, contextual words of the input or query may be examined. Specifically, in the exemplary process 220 for processing a query containing an ambiguous pinyin/non-pinyin ASCII n-gram as shown in FIG. 6, whenever one of the pinyin/non-pinyin ASCII n-gram is encountered as determined at decision block 222, the contextual words as determined at decision block 224, i.e., words to the left (preceding) and to the right (following) of the subject ambiguous n-gram, are examined at block 226 to attempt to determine the language of the ambiguous pinyin/non-pinyin ASCII n-gram and thus to determine the language of the query. For example, a query containing the words "women education" may be classified as an English query since "education" is unambiguously an English word. On the other hand, "women de jiayuan" ("our home" in Chinese) may be classified as a Chinese pinyin query since "jiayuan" is unambiguously not an English word or other non-pinyin ASCII n-gram.

In instances where there is no context (e.g., single term queries) as determined in block 224 or if the context is also ambiguous as determined at block 228, the likelihood or probability of one or more possible Chinese queries that may be generated from the ambiguous query is computed at block 230. If at least one of the possible Chinese queries that may be generated from the ambiguous query has a high likelihood of being a pinyin query as determined at decision block 232, the query is treated as an English query at block 234. Alternatively, if none of the possible Chinese queries that may be generated from the ambiguous query has a high likelihood of being a pinyin query, the query is treated as an English query at block 236. As an example, the one word query "magazine" may be treated as an non-pinyin or English query because when "magazine" is treated as a pinyin query, none of the possible Chinese queries that may be generated "magazine" has a high likelihood of being a pinyin query "ma-ga-zi-ne."

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for training a Chinese language model from Chinese character inputs, comprising:
    segmenting the Chinese character inputs into valid words and unknown character strings, wherein the valid words are entries in a Chinese dictionary and the unknown character strings are not entries in the Chinese dictionary, and wherein the unknown character strings comprise Chinese characters;
    for each unknown character string;
        determining a corresponding first frequency of occurrence for the unknown character string and a corresponding second frequency of occurrence for each of the Chinese characters in the unknown character string;
        comparing the first frequency of occurrence to the second frequency of occurrence to determine an information gain value;
        comparing the information gain value to a threshold;
        identifying the unknown character string as a new valid word when the information gain is greater than the threshold;
    adding the new valid word to the Chinese dictionary to create an updated Chinese dictionary;
    resegmenting the Chinese character inputs into Chinese words, wherein the Chinese words are entries in the updated Chinese dictionary; and
    generating a transition matrix of conditional probabilities for predicting a word given a context based on the resegmenting.

2. The method of claim 1, wherein the transition matrix of conditional probabilities is generated based on n-gram counts generated from the Chinese character inputs where n≧1.

3. The method of claim 2, wherein the n-gram counts include the counts of n-tuples of adjacent and non-adjacent words in the set of Chinese character inputs.

4. The method of claim 2, wherein the n-gram counts include the number of occurrences of each n-word sequence.

5. The method of claim 1, wherein the set of Chinese character inputs includes at least one of user Chinese inputs and a set of Chinese input documents.

6. The method of claim 5, wherein the set of Chinese character inputs includes a set of user Chinese character queries to a web search engine.

7. A computer program product for use in conjunction with a computer system, the computer program product comprising a computer readable storage medium on which are stored instructions executable on a computer processor for training a Chinese model from Chinese character inputs, the instructions including:
    segmenting the Chinese character inputs into valid words and unknown character strings, wherein the valid words are entries in a Chinese dictionary and the unknown character strings are not entries in the Chinese dictionary, and wherein the unknown character strings comprise Chinese characters;
    for each unknown character string;
        determining a corresponding first frequency of occurrence for the unknown character string and a corresponding second frequency of occurrence for each of the Chinese characters in the unknown character string;
        comparing the first frequency of occurrence to the second frequency of occurrence to determine an information gain value;
        comparing the information gain value to a threshold;
        identifying the unknown character string as a new valid word when the information gain is greater than the threshold;
    adding the new valid word to the Chinese dictionary to create an updated Chinese dictionary;
    resegmenting the Chinese character inputs into Chinese words, wherein the Chinese words are entries in the updated Chinese dictionary; and
    generating a transition matrix of conditional probabilities for predicting a word given a context based on the resegmenting.

8. A system for training a Chinese language model from Chinese character inputs, comprising:
    a segmenter configured to segment the Chinese character inputs into valid words and unknown character strings, wherein the valid words are entries in a Chinese dictionary, and the unknown character strings are not entries in the Chinese dictionary and comprise Chinese characters, and the segmenter is further configured to resegment the Chinese character inputs into Chinese words in response to new valid words being identified from the unknown character strings, wherein the Chinese words are entries in an updated Chinese dictionary that includes the new valid words;
    a new word analyzer configured to determine a corresponding first frequency of occurrence for the unknown character string and a corresponding second frequency of occurrence for each of the Chinese characters in the unknown character string, compare the first frequency of occurrence to the second frequency of occurrence to determine an information gain value, compare the information gain value to a threshold, identify the unknown character string as a new valid word when the information gain value is greater than the threshold, and add the new valid word to the Chinese dictionary to create the updated Chinese dictionary; and a Chinese language model training module configured to generate a transition matrix of conditional probabilities for predicting a word string given a context based on the resegmenting.

9. The system of claim 8, wherein the new word analyzer is further configured to generate n-gram counts from the Chinese character inputs where $n \geq 1$ and to generate the transition matrix of conditional probabilities based on the n-gram counts.

10. The system of claim 9, wherein the n-gram counts include the counts of n-tuples of adjacent and non-adjacent words in the set of Chinese character inputs.

11. The system of claim 9, wherein the n-gram counts include the number of occurrences of each n-word sequence.

12. The system of claim 8, wherein the set of Chinese character inputs includes at least one of user Chinese inputs and a set of Chinese documents.

13. The system of claim 12, wherein the set of Chinese character inputs includes a set of user Chinese character queries to a web search engine.

* * * * *